Aug. 2, 1966

H. R. RYERSON ETAL 3,264,580

POWER CONVERTER

Filed Sept. 10, 1962

Herbert R. Ryerson
Andrew Csala

Aug. 2, 1966     H. R. RYERSON ETAL     3,264,580
POWER CONVERTER
Filed Sept. 10, 1962     2 Sheets-Sheet 2
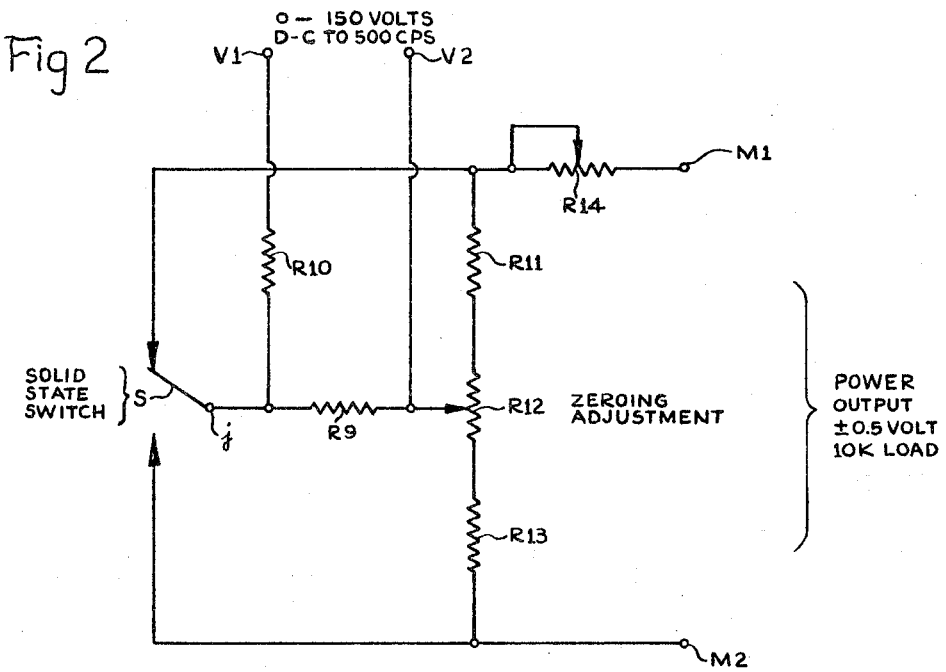
Fig 2
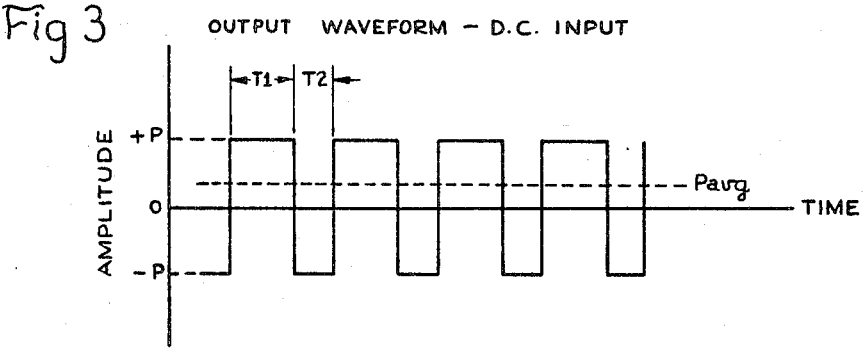
Fig 3    OUTPUT WAVEFORM — D.C. INPUT
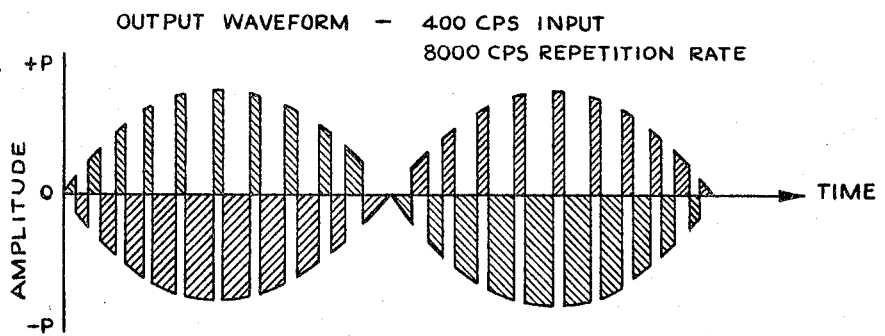
Fig. 4    OUTPUT WAVEFORM — 400 CPS INPUT
8000 CPS REPETITION RATE
Herbert R. Ryerson
Andrew Csala United States Patent Office 3,264,580
Patented August 2, 1966

3,264,580
POWER CONVERTER
Herbert R. Ryerson, Garfield Heights, and Andrew Csala, Cleveland, Ohio, assignors to Avtron Manufacturing, Inc., a corporation of Ohio
Filed Sept. 10, 1962, Ser. No. 222,279
9 Claims. (Cl. 332—12)

This invention relates to a power converter, also known as a watt transducer, for providing an output signal proportional to the power being delivered to a load.

The function of the power converter is to sense the voltage across and the current to a load, and produce a D.-C. current or voltage which is the vector product of load voltage and load current. Typical applications of such a device include telemetering, power monitoring and comparing, and operation of analog and digital wattmeters, power recorders, and control devices such as reverse power relays. Desirable attributes of a power converter are high accuracy, wide frequency range, fast response, low power consumption, high overload capacity and small size, together with reliability and low cost. The general object of the invention is to provide a power converter which is superior in at least some of the above desiderata to the units presently available.

One type of power converter or watt transducer on the market operates on the "Hall effect" principle. By the "Hall effect," certain crystals or semiconductors, when placed in a magnetic field and subjected to a current across one pair of opposite sides, produce a voltage across the other pair of opposite sides. The output voltage is preportional to the product of the instantaneous value of magnetic flux perpendicular to the crystal and the current through it. Practical units of this kind utilize a laminated iron core having an air gap in which the crystal is mounted. In one arrangement, it is intended that the flux be the measure of load voltage. The problem is then posed of maintaining the flux in phase with the load voltage. One solution is to resonate the coil which determines the flux through the core, but this has the disadvantage of making the unit sensitive to frequency. An alternative arrangement consists in making the flux the measure of load current. In such case, the load current is caused to flow through the flux coil, but then the impedance (self-inductance) of the flux coil may alter appreciably the magnitude or phase of the load current.

It is an object of the invention to provide a power converter which overcomes the foregoing difficulties. More specifically, a power converter is proposed wherein the voltage input circuit is inherently a high impedance one responding in phase, and the current input circuit is inherently a very low impedance one likewise responding in phase. A circuit is desired wherein the ranges of voltage or current to which the unit responds may readily be altered. Additionally, the circuit is to be adaptable to receive several inputs for summation or differential operation.

The power converter in accordance with the invention is a transistorized multiplier which responds to the instantaneous power delivered to the load circuit. The principle of operation is the simultaneous pulse-width and amplitude modulation of a repetitive square wave. The width or time-duration of successive half-waves is controlled by the current input; the amplitude or voltage height of successive waves is controlled by the voltage input. The difference in area between successive half-waves is then proportional to the instantaneous product of current by voltage, that is, it is proportional to the insantaneous power, and the average value of the pulse train measures average power.

Pulse-width modulation is achieved by means of a square wave transistor oscillator of the kind using a magnetic core of rectangular saturation characteristics. The core forms a closed magnetic loop and is driven alternately from saturation in one direction to saturation in the other direction. A pair of transistors have their emitter-collector circuits connected into input windings on the core, and their base-emitter circuits connected into feed-back windings. The D.-C. supply energizing the transistors is regulated so that the normal oscillator output is a symmetrical square wave. Pulse width modulation in accordance with the load current is achieved by a low impedance control winding on the core; load current flowing therethrough causes saturation of the core to occur more quickly in one direction than the other. Thus the output wave becomes asymmetric and the difference in width or time-duration between positive and negative pulses or half waves is a measure of the load current. Output windings on the core are used to control a pair of transistor switching circuits in synchronism with the output wave. The transistor switching circuits alternately connect input terminals to which the load voltage is applied, in reverse polarity to signal or meter output terminals. Thus the signal appearing at the output terminals is pulse-width modulated proportionally to the load current, and amplitude modulated proportionally to the load voltage.

An important feature of the multiplier circuit of the invention is the very low impedance of the load current measuring circuit provided by the control winding on the saturable core. The control winding may be a single turn of wire threaded through the core loop and the losses therein with full load current flowing are exceedingly small, being for instance fractions of a watt. This is made possible by the mode of operation of the circuit, the load current not being required to provide the entire magnetization of the core but only to upset the balance in the cyclic magnetization set up by the operation of the oscillator.

For further objects and advantages and for a better understanding of the invention, attention is now directed to the following description of a preferred embodiment to be read in conjunction with the accompanying drawings. The features of the invention believed to be novel will be more particularly pointed out in the appended claims.

In the drawings wherein similar reference characters denote corresponding elements throughout the several views:

FIG. 2 is a schematic diagram of a circuit equivalent to the transistor switching circuit of the converter.

FIG. 3 illustrates a typical output wave-form for a D.-C. input to the converter.

FIG. 4 illustrates a typical output wave-form for an A.-C. input to the converter.

Figure 1:
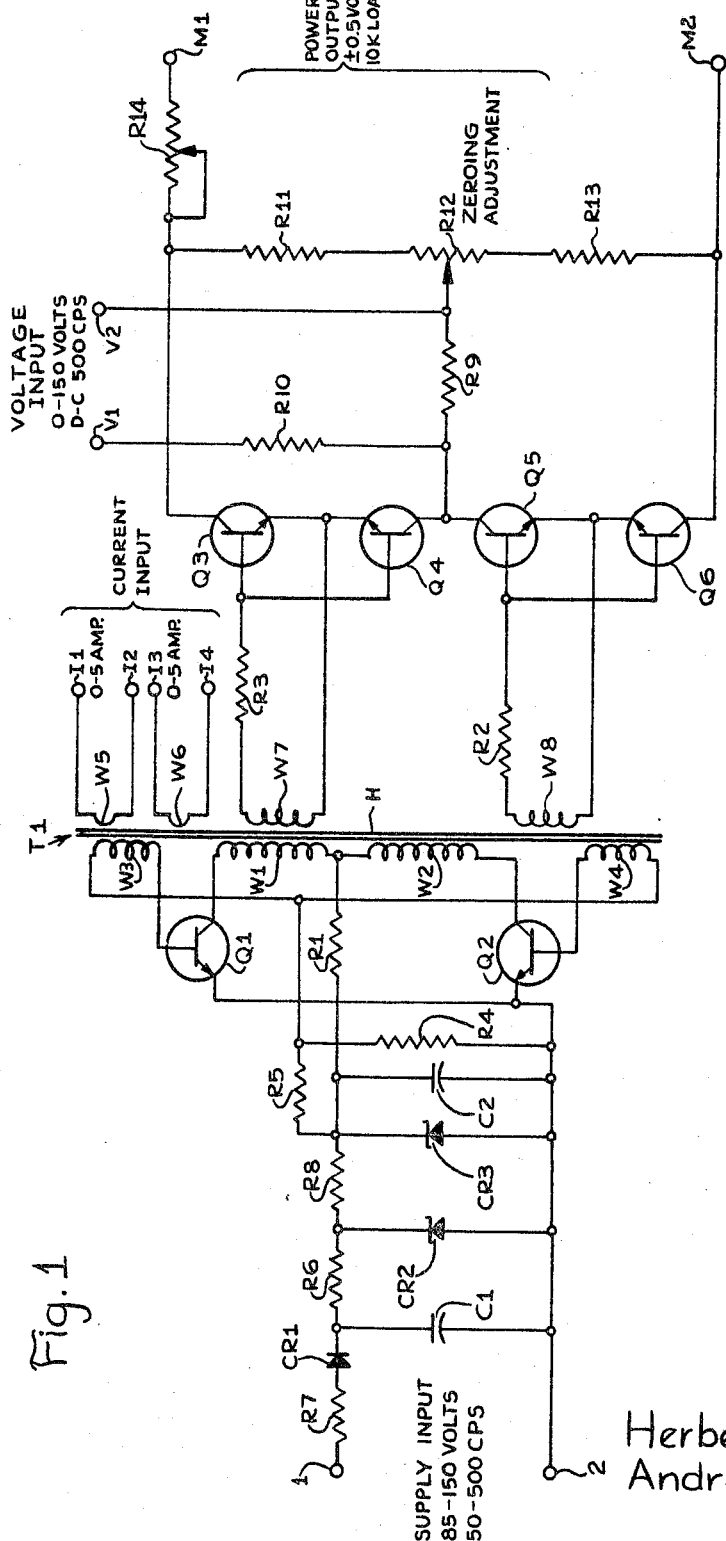
FIG. 1 is a schematic circuit diagram of a power converter circuit embodying the invention in preferred form.

Referring to FIG. 1, the illustrated power converter unit comprises three main portions: a regulated power supply, a transistorized magnetic oscillator, and a transistor switching network.

The function of the regulated power supply is to derive, from the unregulated A.-C. voltage received at supply input terminals 1, 2, a regulated constant D.-C. voltage for the operation of the transistor oscillator. The A.-C. input may be 85 to 150 volts, 50 to 500 cycles per second, and the output is 12 volts D.-C. The first stage of the rectifier comprises resistor R7, diode CR1, and capacitor C1 connected in a half wave rectifier circuit with resistance-capacitance filtering. Further filtering and voltage regulation is provided by resistor R6 and zener diode CR2. A zener diode is a p-n junction connected for reverse conduction which occurs when a certain critical or zener voltage is exceeded. Typically, CR2 may be an 18 volt zener diode, that is, it has an 18 volt breakdown rating. Additional filtering and voltage regulation is provided by resistor R8, zener diode CR3 and capacitor C2. Typically CR3 may be a 12 volt zener diode and the regulated 12 volt D.-C. output for the operation of the transistor oscillator is developed across filter capacitor C2.

The square wave transistor oscillator comprises transistors Q1, Q2, transformer T1, and associated circuitry. The transistors are conventionally represented, the base being indicated by the straight line, and emitter and collector by angled lines, that bearing the arrowhead being the emitter and the arrow indicating the direction of conventional current flow (opposite to electron flow). The illustrated embodiment utilizes n-p-n transistors but obviously p-n-p transistors could equally well be used with suitable reversal of polarities. Transformer T1 includes a saturable magnetic core indicated at H; preferably it is of a known type having a so-called square loop or rectangular hysteresis characteristic. The core forms a closed magnetic loop and may conveniently be toroidal in form. It is characteristic of such cores to pass abruptly from non-saturation into saturation and vice versa.

The emitter-collector circuits of transistors Q1, Q2 proceed from the positive side of capacitor C2, through a series impedance consisting of resistor R1, through opposed input windings W1, W2 respectively of transformer T1, and then through the emitter-collector paths of the respective transistors back to the negative side of capacitor C2. Voltage dropping resistors R4, R5 determine the bias which is applied through feedback windings W3, W4 to the bases of transistors Q1, Q2 respectively.

In the unmodulated operation of the oscillator, assuming that current begins to flow through one transistor, for instance Q1, then such flow through winding W1 induces voltages in windings W3 and W4 which drive Q1 to saturation and Q2 to cut off. As the magnetic flux in core H increases by reason of continuous current flow through winding W1, the core eventually approaches a condition of saturation where no further increase in flux is possible. At this moment the voltage induced in winding W3 for turning on transistor Q1 decreases substantially to zero and current through Q1 falls off. The magnetic flux in core H now starts to decrease and reverse voltages are induced in windings W3 and W4 which drive Q1 to cut-off and Q2 to saturation. Current now flows in windings W2 and the magnetic flux in core H proceeds to build up in reverse direction until reverse saturation occurs. Thereupon another reversal takes place and the process starts over. The rate of change of flux must be such as to induce in winding W1 (or W2) a voltage equal to the supply voltage across C2 less the drop across resistor R1. Therefore, the time to saturation in each half cycle will be inversely proportional to the voltage available to force current through input winding W1 (or W2). Consequently the frequency of the rectangular wave output will remain constant inasmuch as the supply voltage is regulated. Also by having windings W1 and W2 equal, the periods of the positive pulses or half waves will be equal to those of the negative pulses or half waves.

Pulse-width or time-duration modulation of the oscillator output is effected by causing the load current to flow through one or both of control windings W5, W6 on transformer T1. Load current flow aids and opposes the effect of current flow through input windings W1, W2 on alternate swings so that the oscillator output becomes asymmetric. Assume for instance that for a positive pulse or half-wave, the direction of magnetization of the core is referred to as positive, and the flow of load current through winding W5 is such as to bias the core, that is apply to it a magnetomotive force, in the positive direction. Less current through input winding W1 now suffices to cause the build-up of flux; with less current, the voltage drop across R1 is less so that the effective voltage across W1 is greater and the rate of change of flux through the core must be correspondingly greater. The end result is that saturation is reached that much sooner on the positive pulse. Conversely saturation is reached that much later on the negative pulse. Thus the width or time-duration of the positive pulse is decreased; that of the negative pulse is increased. The extent of asymmetry will be proportional to the flux bias, that is, to the load current through windings W5 or W6, and also to the value of R1. The current calibration may readily be modified by varying the value of R1; this is a very useful feature of the circuit.

The output wave from the transistor oscillator is coupled by windings W7, W8 across the emitter-base junctions of transistor pairs Q3, Q4 and Q5, Q6 in the transistor switching network. Resistors R3, R2 in the circuits are for the purpose of limiting base current flow. The reason for having two transistors in so called back-to-back configuration in each branch of the switching network is to assure complete cut-off at the appropriate times no matter what the polarity of applied voltage across the emitter-collector terminals. The load voltage is applied to input terminals V1, V2 and impressed across resistors R10 and R9 in series, only that fraction of the load voltage which is developed across R9 being utilized. This arrangement permits the range or scale of the converter to be changed readily by substituting other sizes of resistors for R10. If desired, for greater convenience, a bank of substitute resistors and switching means therefor (not shown) may be provided. The voltage across R9, that is the potential at junction point j where the transistor pairs Q3, Q4 and Q5, Q6 are joined, is switched alternately from one signal output or meter terminal M1 to the other M2 in synchronism with the pulse-width modulated waveform output of the oscillator. The potential applied to voltage input terminal V2, by reason of the zeroing adjustment provided by potentiometer R12 connected in series with resistors R11 and R13 across the meter output terminals, becomes the reference voltage level in the meter or load circuit. Potentiometer R14 provides a calibrating adjustment when a load is applied across terminals M1, M2, for instance a meter.

The operation of the transistor switching network is most readily understood by reference to FIG. 2 showing an equivalent circuit. Switch S performs the same function as transistor pairs Q1, Q2 and Q3, Q4: it connects point j to terminal M1 during the positive pulses of the oscillator, and to terminal M2 during the negative pulses. Thus the width or time-duration of the output pulses from the switching network is the same as in those from the oscillator. The height or amplitude of the pulses is determined by the voltage input to the switching network. Since consecutive positive and negative pulses are substantially equal in amplitude, the average value Pavg of the pulse train is given by:

$$Pavg = P\left[\frac{T1-T2}{T1+T2}\right] \qquad (1)$$

where P is the pulse amplitude, T1 is the width of the positive pulse, and T2 is the width of the negative pulse. The pulse amplitude is proportional, of course, to the load voltage e applied across terminals V1, V2 of the switching network. The relative width of the positive and negative pulses is governed by the load current i applied to terminals I1, I2 of winding W5 (or W6). When the load current is zero, T1=T2, positive and negative pulses have the same width, and the average output is zero for any value of load voltage input. When the load current has some finite value, the pulses become asymmetric, that is, positive and negative pulses become unequal in width, according to the following relationship:

$$\frac{T1-T2}{T1+T2}=k.i \quad\quad\quad (II)$$

k being a proportionality constant. Substituting Equation II in Equation I, it is seen that:

$$Pavg=k.e.i \quad\quad\quad (III)$$

Equation III indicates that the average value of the pulse train is proportional to the product of instantaneous voltage by instantaneous current. Hence by measuring the average value, one obtains a measurement of the instantaneous power.

For most applications, the external readout device such as a galvanometer connected across the signal output terminals M1, M2 responds to the time average of instantaneous power. The meter will read $E.I \cos \theta$ where E and I are the R.M.S. values of voltage and current respectively, and $\theta$ is the angle by which the current and voltage vectors are separated. In the more general case with nonsinusoidal waveforms, the meter reads the average power given by:

$$\frac{1}{T}\int_0^T e.i dt,$$

where $e$ and $i$ are the instantaneous values. Thus the converter measures true watts for both D.-C. and A.-C. circuits for a wide variety of frequencies, power factors and waveforms. The upper limit of frequency to which the meter will respond depends upon the pulse repetition rate or frequency which must, of course, be appreciably higher than that of the measured input. For instance, in a preferred embodiment, using an 8000 c.p.s. repetition rate, the converter will respond with an accuracy of 1% of full scale from D.-C. to 500 c.p.s.

A typical output waveform from the converter with D.-C. voltage and current inputs is illustrated in FIG. 3. A typical output waveform in measuring 400 c.p.s. power when the repetition rate of the oscillator is 8 kilocycles is illustrated in FIG. 4. If the waveform in FIG. 3 represents forward power flow, that in FIG. 4 represents reverse power flow, the average being above the zero axis in the former case but below it in the latter case.

Figure 5:
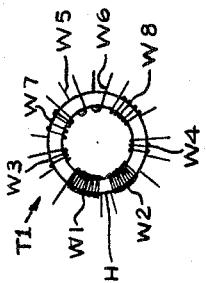
FIG. 5 illustrates, in partly diagrammatic form, the saturable transformer of the power converter.

An unusual and highly advantageous feature of the converter is the substantially zero impedance nature of the current measuring curcuits, that is control winding W5 or W6 of transformer T1. As previously mentioned, the core of transformer T1 is of the so-called square loop or rectangular hysteresis type. In such material, a plot of the flux-magnetomotive force characteristic is essentially rectangular; substantially no change in flux occurs until the applied magnetomotive force attains a certain level; at this level, the material passes abruptly into saturation. FIG. 5 illustrates in partly diagrammatic fashion, the transformer T1 of the preferred embodiment. The core consists of an encased toroid of square loop material less than ¾ inch in diameter. Such units are commercially available; they may be visualized as being about the size of the usual wedding ring. The windings W1, W2 each consist of 200 turns; windings W3, W4 of 20 turns each; windings W7, W8 of 40 turns each, windings W5, W6 which constitute the current measuring circuits each consist of a single turn, being simply a short piece of hook-up wire passed through the toroid. Using one current winding, or both connected in parallel, the converter rating is 0 to 5 amperes, 500 watts full scale; using the two windings in series, the rating 0 to 2.5 amperes, 250 watts full scale.

The current windings do not cause the basic magnetization of the core but provide only the biasing magnetomotive force which results in asymmetry in operation of the oscillator. Relative to the other windings on the transformer, the current windings operate not as true current transformer windings but rather as sensing elements which perform equally well on D.-C. as A.-C. There is no component of flux at the frequency of the load current input signal; the load current merely changes the rate at which current flows from the D.-C. supply, that is from capacitor C2 through resistance R1. The core cannot induce a D.-C. voltage in windings W5, W6 because the coupling is magnetic, nor A.-C. voltages except for minute high frequency voltages corresponding to the pulse repetition rate of the oscillator; thus there is no net transport of energy. Therefore the reactance of the windings is very low, being in one sense merely the equivalent air core reactance and substantially zero. consequently there are no losses coupled into the current circuits by transformer action and the only losses are the $I^2R$ losses of the current conductors. In the preferred embodiment, the resistance of each single turn current winding W5 or W6 is less than .005 ohm; therefore the losses with 5 amperes flowing will be less than .125 watt. Connecting the two windings in parallel cuts the losses in half without changing full scale current. Connecting the two windings in series makes full scale current 2.5 amperes and also cuts the losses in half.

The current sensitivity of the converter may be increased by providing more than one turn in windings W5, W6. The current sensitivity is in general proportional to the number of turns provided; thus 10 turns will produce full scale response at approximately 0.5 ampere load current.

The two current windings W5, W6 may be used additively or differentially to determine sum or difference power in two circuits having a common voltage. Thus 1 ampere through W5 and 2 amperes in phase through W6 is equivalent to 3 amperes through either circuit. However if the phase of the current through W6 is reversed, this is equivalent to 1 ampere in reverse phase through either circuit. Another use of the two current circuits is in the connection of two converters with isolation transformers to provide a single output voltage proportional to the total power in a polyphase system in a manner corresponding to a 2½ element wattmeter for use on 3-phase 4-wire systems. The full scale rating of the converter may of course be extended to any extent desired through the use of external current or voltage transformers or multipliers.

In the preferred illustrated embodiment of the invention, the voltage circuit is rated 0 to 150 volts, D.-C. to 500 c.p.s. with a maximum power consumption of 150 milliwatts. The current circuits are rated 0 to 2.5/5 amperes, D.-C. to 500 c.p.s. The power measurement rating 250/500 watts with a 0.5 volt full scale output into a 10,000 ohm load. The requirements of the power supply for the oscillator are 85 to 150 volts, 50 to 500 c.p.s., 5 watt nominal consumption; where these requirements preclude drawing the power from the voltage circuit, separate excitation may be used.

The preferred embodiment of the invention which has been described is intended as exemplary and not in order to limit the invention thereto. The appended claims are intended to cover such modifications as fall within the true spirit and scope of the invention.

What we claim as new and desire to secure by Letters Patent of the United States is:

1. A power converter for providing a signal indicative of the power flowing into a load circuit comprising a transistor oscillator including a D.C. voltage supply, a pair of transistors, a transformer having a core of saturable magnetic material with input windings connected in series circuit with the emitter-collector paths of said transistors across said supply for supplying to said core magnetomotive forces acting in opposite directions, and feedback windings connected to the bases of said transistors for turning said transistors alternately on and off as said core saturates cyclically first in one direction then in the other whereby to sustain oscillations, a low impedance control winding on said core for series connection into the load circuit, said control winding being proportioned in respect of a selected range of load current to produce a magnetomotive force biasing said core in order to pulse-width modulate opposite half cycles of said oscillations according to load current, voltage input terminals for connection across the load circuit, signal output terminals, and transistor switching means alternately connecting said voltage input terminals to opposite signal output terminals in synchronism with said oscillations, whereby to provide at said output terminals a signal which is pulse-width modulated according to load current and amplitude modulated according to load voltage.

2. A power converter for providing a signal indicative of the power flowing into a load circuit comprising a transistor oscillator including a D.C. voltage supply, a pair of transistors, a transformer having a core of saturable material of square loop hysteresis characteristic forming a closed magnetic loop, input windings on said core connected in series circuit with the emitter-collector paths of said transistors across said supply for supplying magnetomotive forces acting to saturate the core in opposite directions, and feedback windings connected to the bases of said transistors for turning said transistors alternately on and off as said core saturates cyclically first in one direction then in the other whereby to sustain oscillations, a low impedance control winding on said core for series connection into the load circuit and consisting of at least one turn of a conductor threaded through said core loop, the number of turns in said control winding being such that flow of load current therethrough produces a magnetomotive force biasing said core whereby to achieve pulse-width modulation of opposite half cycles of said oscillations according to instantaneous load current, voltage input terminals for connection across the load circuit, signal output terminals, and transistor switching means alternately connecting said voltage input terminals to opposite signal output terminals in synchronism with said oscillations, thereby providing at said output terminals a signal which is pulse-width modulated according to load current and amplitude modulated according to load voltage.

3. A power converter for measuring power flow comprising a transistor oscillator including a D.C. voltage supply, a pair of transistors, a transformer having a core of saturable material of square loop hysteresis characteristic forming a closed magnetic loop, input windings on said core connected in series circuit with the emitter-collector paths of said transistors across said supply for supplying magnetomotive forces acting to saturate the core in opposite directions, and feedback windings connected to the bases of said transistors for turning said transistors alternately on and off as said core saturates cyclically first in one direction then in the other whereby to sustain oscillations, a pair of low impedance control windings on said core for series connection into load circuits to measure sum or difference power therein, each control winding consisting of at least one turn of a conductor threaded through said core loop, the number of turns in said control windings being such that flow of load current therethrough produces a magnetomotive force biasing said core but insufficient to saturate it whereby to achieve pulse-width modulation of opposite half cycles of said oscillations according to instantaneous load current, voltage input terminals for application thereto of load voltage, signal output terminals, and transistor switching means alternately connecting said voltage input terminals to opposite signal output terminals in synchronism with said oscillations, thereby providing at said output terminals a signal which is pulse-width modulated according to resultant load current and amplitude modulated according to load voltage.

4. A power converter for providing a signal indicative of power flow comprising a regulated D.-C. supply, a resistance, a transistor oscillator including a pair of transistors, a transformer having a core of saturable material forming a closed magnetic loop with input windings connected in series circuit with the emitter-collector paths of said transistors across said D.-C. supply in series with said resistance for supplying to said core magnetomotive forces acting in opposite directions, and feedback windings connected to the bases of said transistors for turning said transistors alternately on and off as said core saturates cyclically first in one direction then in the other whereby to sustain oscillations at a given frequency, a low impedance control winding on said core for series connection into a load circuit in order to pulse-width modulate opposite half cycles of said oscillations in accordance with the instantaneous value of current through said load circuit having a substantially lower frequency than said given frequency, voltage input terminals for application thereto of load voltage, signal output terminals, and transistor switching means alternately connecting said voltage input terminals to opposite signal output terminals in synchronism with said oscillations, whereby to provide at said output terminals a signal which is pulse-width modulated according to load current and amplitude modulated according to load voltage.

5. A power converter as defined in claim 4 and including two low impedance control windings each consisting of a single conductor turn threaded through said core loop.

6. A power converter for providing a signal indicative of the power flowing into a load circuit comprising a regulated D.-C. supply, a square wave transistor oscillator including a pair of transistors, a transformer having a core of saturable material of square loop hysteresis characteristics, opposed input windings on said core connected across said source in series with an impedance and the emitter-collector circuits of said transistors, feedback windings on said core connected into the base-emitter circuits of said transistors for turning said transistors alternately on and off as said core saturates cyclically first in one direction then in the other whereby to sustain oscillations, a low impedance control winding on said core for series connection into the load circuit in order to pulse-width modulate opposite half cycles of said oscillations according to load current, said control winding being proportioned in respect of a selected range of load current to produce a magnetomotive force biasing said core, a pair of output windings on said core, voltage input terminals for connection across the load circuit, a pair of signal output terminals and transistor switching networks controlled by the output windings on said core for effecting conductivity alternately between said voltage input terminals and opposite signal output terminals in synchronism with said square wave oscillations, whereby to provide at said output terminals a signal which is pulse-width modulated according to load current amplitude modulated according to load voltage.

7. A power converter for providing a signal indicative of the power flowing into a load circuit comprising a regulated D.-C. supply, a square wave transistor oscillator including a pair of transistors, a transformer having a core of saturable material of square loop hysteresis characteristic forming a closed magnetic loop, opposed input windings on said core connected across said supply in series with a resistance and the emitter-collector circuits of said transistors, feedback windings on said core connected into the base-emitter circuits of said transistors for turning said transistors alternately on and off as said core saturates cyclically first in one direction then in the other whereby to sustain square wave oscillations, a low impedance control winding on said core for series connection into the load circuit, said control windings being proportioned in respect of a selected range of load current to produce a magnetomotive force biasing said core in order to pulse-width modulate opposite half cycles of said oscillations according to the instantaneous value of load current without net transport of energy, a pair of output windings on said core, voltage input terminals for connection across the load circuit, a pair of signal output terminals, transistor switching networks interconnecting through their emitter-collector circuits said voltage input terminals with said signal output termnals, and connections from the output windings on said core into the base-emitter circuits of said transistor networks for effecting conductivity alternately between said voltage input terminals and opposite signal output terminals in synchronism with said square wave oscillations, whereby to provide at said output terminals a signal which is pulse-width modulated according to load current and amplitude modulated according to load voltage.

8. A power converter as defined in claim 7 and wherein the low impedance control winding consists of a single conductor turn threaded through said core loop.

9. A power converter as defined in claim 7 having a pair of low impedance control windings each consisting of a single conductor turn threaded through said core loop.

References Cited by the Examiner

UNITED STATES PATENTS 2,994,840 8/1961 Dorsman _____ 331—113.1
3,078,380 2/1963 Ingman.

OTHER REFERENCES

"Square-Wave Analog Multiplier" by G. L. Keister, at page 232 of Transistor Circuits and Applications, John M. Carroll, pub. by McGraw-Hill, Lib. of Congress Catalog Card No. 56–12257, copright 1957.

IBM Technical Disclosure Bulletin "High Voltage Supply" Mikonis, vol. 5, No. 5, October 1962, page 62.

JOHN F. COUCH, *Primary Examiner.*

LLOYD McCOLLUM, *Examiner.*

J. M. THOMSON, M. L. WACHTELL,
*Assistant Examiners.*